Sept. 4, 1951      U. C. WALK      2,566,389

ORDNANCE SIGHT

Filed Nov. 28, 1945

INVENTOR
UDELL C. WALK

BY

ATTORNEY

Patented Sept. 4, 1951

2,566,389

UNITED STATES PATENT OFFICE 2,566,389

ORDNANCE SIGHT

Udell C. Walk, United States Navy, Carmel, Calif.

Application November 28, 1945, Serial No. 631,463

2 Claims. (Cl. 33—49)

(Granted under the act of March 3, 1883, as amended April 30, 1928; 370 O. G. 757)

This invention relates to ordnance sights and more particularly to illuminated gunnery sights for use in aeroplanes. Since its use in fixed gunnery is more common, the invention is hereafter described as used by a pilot in this connection but the description applies as well to use by a gunner in free gunnery where he desires to know the plane's altitude.

"Free gunnery" is that type of gunnery wherein the gun is movable relative to the plane, as in a turret. "Fixed gunnery" is the type of gunnery wherein the guns are fixed relative to the plane, as in the wings or in a hollow propeller shaft. The same fixed gunnery sight may be used at different times for aiming guns in strafing or in a battle and for bombing, particularly dive bombing. When making a dive bombing run it is essential that the pilot know his altitude at all times.

An object of the invention is to provide an illuminated gunnery sight for use in an aeroplane whereby the pilot or gunner of the plane can observe at any time the altitude of the plane in which the sight is mounted without removing his eye from the sight.

Another object of the invention is to provide a compact illuminated sight unit including an altimeter so arranged as to show its reading within the field of vision of the pilot or gunner while his eyes remain fixed on the viewer of the sight.

In accomplishing these and other objects of the present invention, I have provided improved details of structure, the preferred form of which is illustrated in the accompanying drawing wherein.

Figure 2:
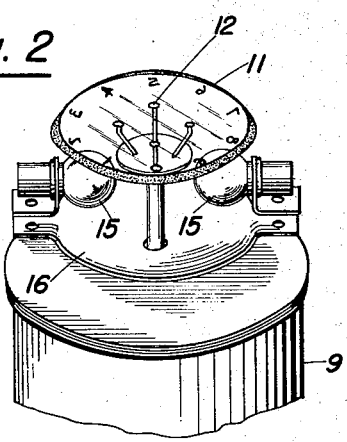
Fig. 2 is a view of the device of Fig. 1 with a portion of the sight removed to more clearly show the indicating members of the altimeter.

Referring more in detail to the drawing:

The numeral 1 indicates a conventional type of sight. Numeral 2 designates a viewer of transparent material, usually plate glass, through which the pilot observes the target. The viewer is mounted at an angle of 45° from the vertical with its upper edge toward the reader. It is observed through a conventional eyepiece, not shown. A glass disc 3 coated on its upper surface to produce a mirror reflecting light downward is clamped between a clamping ring 4 and a hard rubber spacing ring 5 by means of screws 6. Between the lower surface of ring 5 and a gasket 7 is clamped a color filter 8, usually of orange glass, to increase visibility of the reticle.

Figure 1:
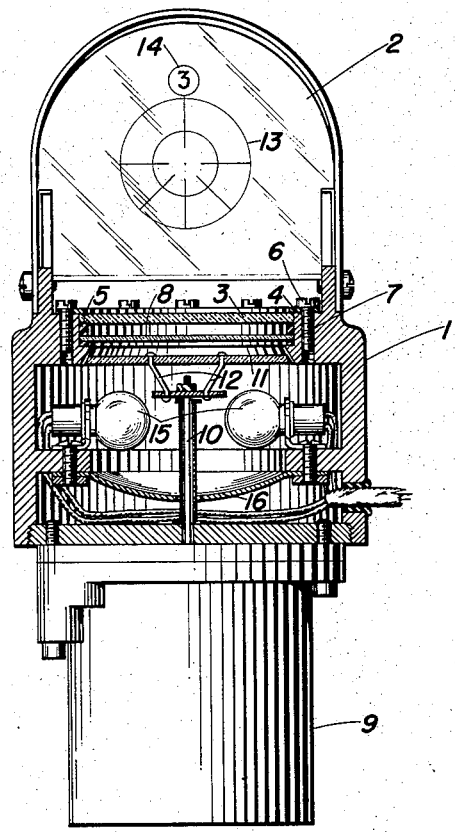
Fig. 1 is a view, partially in elevation and partially in section, of an illuminated sight embodying the features of the present invention.
Figure 3:
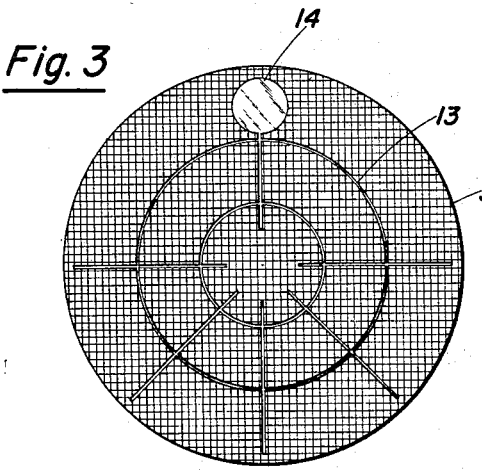
Fig. 3 is a view of the reticle as it would be seen from above when in position.

Attached to the sight 1 is a conventional altimeter generally indicated by the numeral 9. On an extension 10 of the indicator shaft of the altimeter is mounted a transparent disc 11 by means of arms 12. The disc 11 carries indicia thereon, the position of which indicate the altitude of the instrument. A design 13 is provided on the disc 3 by etching or scratching through the reflecting coating to produce lines of clear glass through which light can be transmitted. The design 13 constitutes a reticle and may be of any convenient character, such as with mil rings, to facilitate alignment of the weapon with the target. Also on the disc 3 is a clear, uncoated space 14 vertically aligned with the indicia on the disc 11. Lamps 15, aided by reflector 16 and the mirrored surface of disc 3, project the reticle onto the viewer 2 and also project the indicia on disc 11 through the clear space 14 of disc 3 onto the viewer 2. In Fig. 1, the altimeter is indicating an altitude of 3 units.

To use the device the pilot aligns the design of the reticle, as seen projected on the viewer 2, with the target and, without removing his eye from the sight, observes the reading of the altimeter also projected onto the viewer.

While I have shown but one embodiment of my invention, it is susceptible to modification without departing from the spirit of the invention. I do not wish, therefore, to be limited by the disclosures set forth, but only by the scope of the appended claims.

The invention described herein may be manufactured and used by or for the Government of the United States of America for governmental purposes without the payment of any royalties thereon or therefor.

I claim:

1. In a device of the character described, an ordnance sight, having a viewer, a reticle bearing member, a transparent space on said member and means for projecting a design on said reticle bearing member onto said viewer; an altimeter attached to said ordnance sight, and a transparent disc actuated by said altimeter having indicia thereon for showing altitude, said disc being disposed between said projecting means and said reticle bearing member so that said indicia are projected through said transparent space onto said viewer.

2. An ordnance sight comprising a first disc having a reticle, a second disc coaxial therewith and bearing circumferentially arranged indicia, means for angularly positioning said second disc as a function of altitude, a transparent area on said first disc, a viewer, and light means for projecting an image of said reticle onto said viewer and for projecting an image of one of said indicia through said transparent area and onto said viewer.

UDELL C. WALK.

REFERENCES CITED

The following references are of record in the file of this patent:

UNITED STATES PATENTS

| Number | Name | Date |
|---|---|---|
| 1,043,562 | Bedell | Nov. 5, 1912 |
| 1,666,179 | Reeves | Apr. 17, 1928 |
| 1,871,877 | Buckman | Aug. 16, 1932 |
| 2,264,044 | Lee | Nov. 25, 1941 |
| 2,404,746 | Rylsky et al. | July 23, 1946 |

FOREIGN PATENTS

| Number | Country | Date |
|---|---|---|
| 505,115 | France | Apr. 28, 1920 |